(12) United States Patent
Yosefi et al.

(10) Patent No.: US 11,468,554 B2
(45) Date of Patent: Oct. 11, 2022

(54) ASSESSING PRINTER QUALITY BY ASSIGNING QUALITY SCORES TO IMAGES

(71) Applicant: Electronics for Imaging, Inc., Fremont, CA (US)

(72) Inventors: Hanan Yosefi, Ganei tikva (IL); Dani Barel, Herzlia (IL)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 341 days.

(21) Appl. No.: 16/704,842

(22) Filed: Dec. 5, 2019

(65) Prior Publication Data

US 2021/0118114 A1    Apr. 22, 2021

Related U.S. Application Data

(60) Provisional application No. 62/923,196, filed on Oct. 18, 2019.

(51) Int. Cl.
*G06T 7/00* (2017.01)
*H04N 5/225* (2006.01)
*H04N 5/247* (2006.01)

(52) U.S. Cl.
CPC .... *G06T 7/001* (2013.01); *G06T 2207/30144* (2013.01); *H04N 5/2253* (2013.01); *H04N 5/2256* (2013.01); *H04N 5/247* (2013.01)

(58) Field of Classification Search
CPC ...... G03G 9/081; G03G 15/80; G06K 15/027; G06K 15/408; G06K 9/00134; G06K 9/00147; G01N 33/49; G06T 7/001; H04N 5/2253; G07F 17/3258

USPC .............................. 382/112; 430/56; 702/187
See application file for complete search history.

(56) References Cited

U.S. PATENT DOCUMENTS

| | | | |
|---|---|---|---|
| 8,810,810 | B2 | 8/2014 | Ohama |
| 9,939,386 | B2 | 4/2018 | Lewis et al. |
| 9,953,435 | B2 | 4/2018 | Fergen et al. |
| 2003/0063275 | A1 | 4/2003 | Hubble et al. |
| 2008/0059120 | A1* | 3/2008 | Xiao ................... G06F 11/0748 702/187 |
| 2009/0079780 | A1 | 3/2009 | Picciotto et al. |
| 2009/0184990 | A1 | 7/2009 | Shang et al. |
| 2010/0296834 | A1* | 11/2010 | Omori ................ G03G 15/0898 399/99 |
| 2010/0296854 | A1 | 11/2010 | Otsuki et al. |
| 2011/0075193 | A1 | 3/2011 | Kumamoto et al. |
| 2011/0096119 | A1 | 4/2011 | Ito |

(Continued)

FOREIGN PATENT DOCUMENTS

| | | |
|---|---|---|
| JP | 2015120264 A | 7/2015 |
| WO | 2015117943 A1 | 8/2015 |

*Primary Examiner* — Phuoc H Doan
(74) *Attorney, Agent, or Firm* — Perkins Coie LLP (57) ABSTRACT

Disclosed here is a system enabling users/customers to receive an objective assessment of the performance of a printer. This is accomplished by comparing a quality score of an earlier-in-time image with a quality score of a later-in-time image. A processor analyzes each image based on several criteria and uses various image-analysis methods, to flag errors within an image. A numeric quality score, based on the number of errors, is provided to the user to objectively evaluate whether the printer has degraded or not. Thus, the user can objectively present an argument to a salesperson or manufacturer that the user is due a remedy.

11 Claims, 7 Drawing Sheets

(56) References Cited

U.S. PATENT DOCUMENTS

| | | |
|---|---|---|
| 2012/0194600 A1 | 8/2012 | Kido |
| 2013/0016154 A1 | 1/2013 | Imamura et al. |
| 2014/0079292 A1 | 3/2014 | Kaneko et al. |
| 2015/0077464 A1 | 3/2015 | Silveston-Keith et al. |
| 2015/0138266 A1 | 5/2015 | Chen et al. |
| 2015/0336381 A1 | 11/2015 | Kyoso et al. |
| 2015/0360491 A1 | 12/2015 | Billow et al. |
| 2016/0129709 A1 | 5/2016 | Nolting et al. |
| 2016/0283833 A1 | 9/2016 | Peek |

* cited by examiner

ASSESSING PRINTER QUALITY BY ASSIGNING QUALITY SCORES TO IMAGES

CROSS-REFERENCE TO RELATED APPLICATIONS

This application claims priority to U.S. Provisional Patent Application No. 62/923,196 filed on Oct. 18, 2019, entitled "SYSTEM AND METHOD FOR ASSESSING PRINTER QUALITY," which is hereby incorporated by reference in its entirety.

TECHNICAL FIELD

The disclosed teachings relate to printer systems. More specifically, the disclosed teachings relate to printer quality assessment systems.

BACKGROUND

Manufacturers focus a lot of their efforts on delivering high quality products. Investment early on in the production process can help insure that customers are happy to purchase to product and while using the product. Nevertheless, customers may return to the seller with complaints such as a damaged parts, unsatisfactory performance, or various other complaints.

Specifically, in the printer manufacturing business, companies struggle with customer complaints. Complaints can be due to various reasons such as degradation in printing quality, noise, slow response rate, etc. However, since there are many intricate parts within a printer that can cause issues, it is difficult for the human eye to detect the cause of issues. Moreover, it is even more difficult to assess degradation in printing quality. In other words, it is difficult to objectively judge whether quality of the printed images generated at one time by one printer is similar or within a pre-defined tolerance, to the quality of the same images printed at another time by the same or different printer.

However, to reduce the possibility of discontent, a potential customer is shown the various features and capabilities of a printer prior to its sale. The potential customer may also be provided with printed samples from a demo printer that the customer examines and uses to make the decision to purchase. At a later time, after the printer has been purchased and used, the customer may complain that the quality of the printer is either not equivalent to the quality shown prior to its sale or has degraded from the time of purchase. Therefore, there is a need for a method of objectively measuring the printing quality of the purchased printer and comparing it to the quality of the demo printer or to the purchased printer's quality from an earlier time.

BRIEF SUMMARY

The disclosed embodiments include a printer quality assessment system and method. The quality assessment system includes an image capture device such as a scanner or camera, light source(s), and processor(s). The quality assessment system can be housed within the printer. The image capture device can be on a print head carriage or a printing table. The light source can be mounted near the image capture device. The light source can be used to light up the image for the image capture device to capture the image with sufficient detail to later perform analysis.

Embodiments of the printer quality assessment system also include multiple light sources, and different and multiple image capture devices. The number of light sources and image capture devices that are used can depend on the location of the image quality assessment system. For example, the system can be placed atop the printing table, making it easier to use a scanner device with multiple light sources. In another example, the system can be place near the print heads. In this case, it may be easier to use a camera with one light source.

Furthermore, the present disclosure includes a method of assessing the quality of a printer. The method includes using the quality assessment system to evaluate both an image printed at one time (i.e., reference image) and an image printed at another time. The reference image can be printed by a different printer and at a different time. However, the image must be the same image. The printer, where the evaluation is being performed, can use a processor to evaluate the images and provide the user with an objective numeric quality score for each image. The scores can be a numeric representation of the quality of the images.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Other aspects of the disclosed embodiments will be apparent from the accompanying Figures and Detailed Description.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various example embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this Detail Description section.

There are several components to a printer quality assessment system. The system can contain one or more image capture devices such as color camera(s), area or line, one or more color scanner(s), or both. The image capture devices can be mounted near or on the print heads, or the printing table. The image capture devices can capture the image with enough resolution to be able to detect differences such as color changes, resolution, etc. Generally, 40 µm resolution is sufficient to detect differences between images. For example, the system can include an area scan color camera (i.e., Basler acA1920-40 gc). The camera can be attached to the print head carriage of printer. In this arrangement, the camera can take a picture of the printed image after the print heads have completed their task.

In another embodiment, the system can include multiple cameras in different locations: a line scan camera mounted on the printing table and an area scan camera mounted to the print heads. This arrangement can act as a failsafe in case one camera fails or can allow for double-verification of the analysis. For example, a printed image can first be processed based on the data from the area scan camera mounted on the print heads. The analysis from this camera can provide a certain numeric quality score to the user. Subsequently, the printed image can be processed based on the data from the line scan camera mounted on the printing table. After which, the user can receive another numeric quality score. The user can then compare the two numeric quality scores to verify that the numeric quality score of the image is accurate. If they are not similar, within an accepted tolerance, the user may decide to re-do the analysis, use different images, use a different printer, etc.

In another embodiment, quality assessment system can contain a multi-pass printer with an area scan color camera (i.e., Basler acA1920-40gc) attached to the head carriage of a wide format inkjet printer that scans the media and prints an image. The area scan color camera is installed in a position such that the printed image is below its lens after the image has been dried or cured. For example, the print head carriage may finish printing the image, then the wide format printer may not move the printed image to the printer tray until the area scan color camera has taken a picture of the printed image. Conversely, the area scan color camera may take multiple pictures as the printer completes printing portions of the image. In this case, the printer may move the printed image along the printing belt as the print heads print a portion of the image. The area scan color camera may take multiple pictures of each printed portion. After which, the processor can compile the pictures for analysis.

Figure 1:
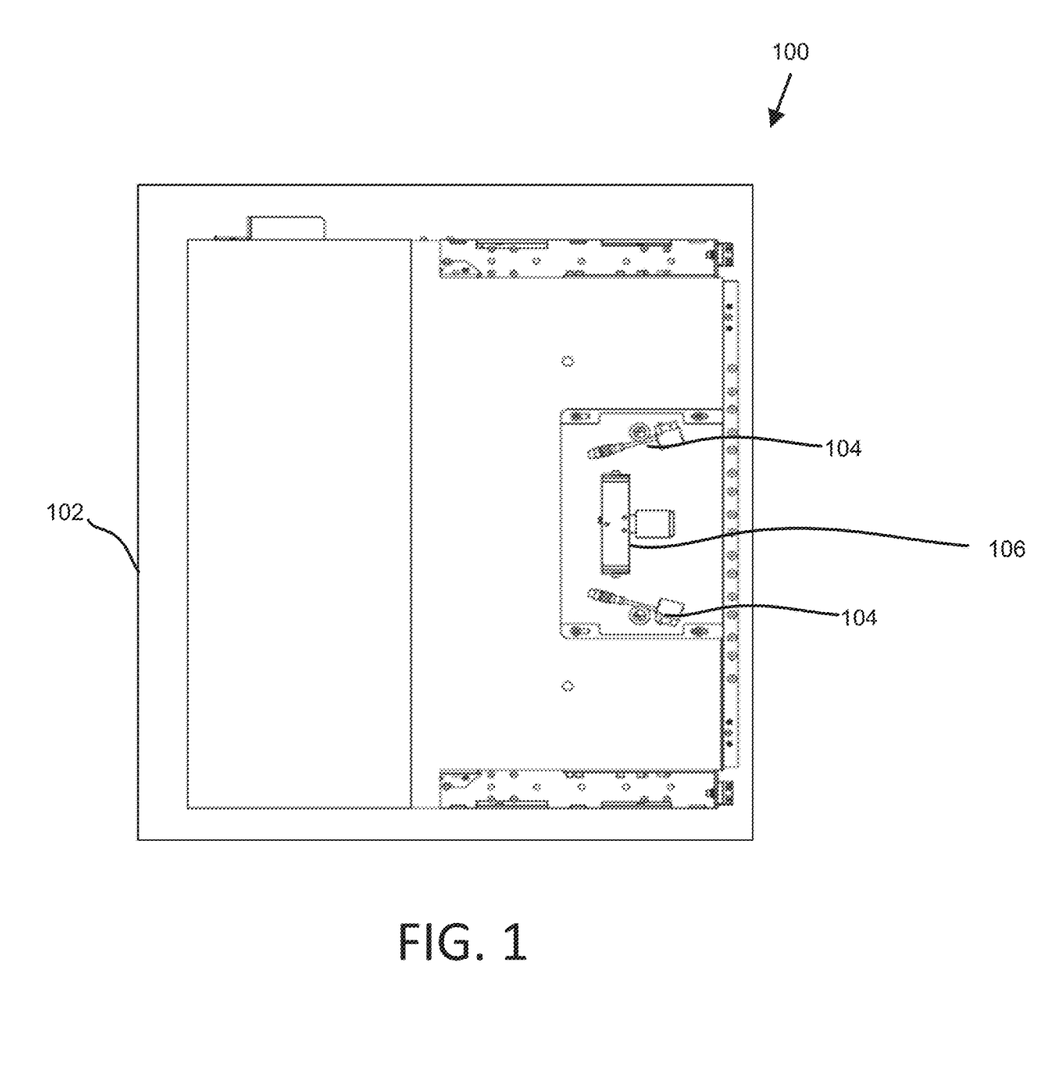
FIG. 1 illustrates a frontal view of a printer component encompassing an embodiment of the printer quality assessment system.

FIG. 1 illustrates a frontal view of a printer encompassing an embodiment of the printer quality assessment system. FIG. 1 shows the quality assessment system 100 with printer 102, light source(s) 104, and camera 106. This system allows for evaluating images printed by one printer at one time and the prints of the same images printed at the same or different time by the same or different printer.

In an embodiment of the quality assessment system 100 in FIG. 1, camera 106 can be a line scan camera such a Teledyne/Dalsa LA-GC-02K05B-00-R2048×2 color GIGE. The line scan camera can be mounted and operated similar to the area scan camera mentioned above. In this embodiment, the line scan camera can capture lines at, for example, 45 kHz, along with a carriage speed of 2 m/s. This allows for a sampling resolution of approximately 44 um.

In addition to image capture device(s), the quality assessment system 100 can include one or more light source(s) 104. The one or more light source(s) 104 should preferably be mounted near the camera 106, at a distance and angle such that light is reflected from the media without blinding the camera or getting hot spots on the media. In other words, the light source(s) 104 should uniformly illuminate the media. If this is not possible, a light diffuser may be used as long as the reduction in light does not prevent the camera 106 from capturing the image with sufficient detail. Additionally, the light source(s) 104 should not distort the coloring of the printed image. For example, the light source(s) 104 cannot emit green light onto a printed image that is substantially red. This will likely result in a discoloration of the image when the camera 106 takes a picture.

By using camera 106 and light source(s) 104, the quality assessment system 100 can analyze the printed image. Generally, camera 106 sends a captured image to a processor(s) to analyze the image. The processor(s) can evaluate both the printed image and a previous image (i.e., reference image). It is critical that such evaluation is done under similar conditions such as same media (i.e., image), environmental conditions (i.e., temperature, humidity, illumination etc.), and printer settings (i.e., heads' status, system power, etc.). Additionally, it is known in the art that calibration of the camera(s), printer, etc. may be necessary to accurately evaluate the images.

In an embodiment, the quality assessment system 100 can have a camera 106 mounted on the print heads carriage of printer 102. Once the image arrives below the lens of the camera 106, the camera 106 can rapidly capture frames of the image with standard exposure time. Typically, the carriage moves at a speed of 2 m/s. The exposure time, to avoid blurry images, can be 10 us or less. However, due to the short exposure time, a high intensity light source can be necessary to illuminate the print. This can be done with pulses of light with a duration of 10 us. The light pulses should be synchronized with the exposure time of camera 106 to ensure that the image is illuminated when the shutter of camera 106 is exposed to light.

In another embodiment, the timing of the light pulses can be programmed to capture the printed image with sufficient resolution and such that the carriage travels a distance equivalent to or less than the field-of-view (FOV) of the lens of camera 106. For example, at a 2 m/s carriage speed and FOV of 75 mm, the time between two trigger pulses should be 37.5 ms or less.

Additionally, the trigger pulses by the camera 106 and light source(s) 104 can be generated by a control computer (not shown) that is connected to the printer 102. The relationship between the control computer and printer can be established through known methods. For example, a computer can be external to the printer 102 and connected via a universal serial bus (USB), Bluetooth, WiFi, or other communications methods. In another embodiment, the computer can be on board the printer 102. The printer 102 can have an interface for the user to interact with the computer and receive data.

After the quality assessment system 100 has captured the image(s) in frames, the frames can be transferred to a computer. The computer can evaluate both the later-in-time image and the earlier-in-time or reference image. The reference image preferably has the same resolution as the later-in-time image. If, however, there are errors such as the scanner(s) or camera(s) taking overlapping images, they need to be resolved, using known methods, prior to the evaluation.

An overlapping image can be taken when the scanner or camera 106 captures consecutive images or adjacent media in the same frame. This error can occur, for example, when the trigger pulses, mentioned above, are not in sync with the carriage speed. One way to resolve an overlapping issue is to map the overlapping pixels in the frame, both between consecutive frames and between two adjacent scan lines, and to store the overlapping part only once. For example, store only the overlapping part from the first frame (i.e., right most pixels) and discard it from the following frame (i.e., left most pixels), or store the overlapping part from the first frame in one scan line (i.e., bottom part of the frame) and discard it from the frame in the same position in the following scan line (i.e., top part of the frame). Special treatment may be required for the frames on the borders of the image to discard the parts that are outside of the printed image. Another way to resolve an overlapping issue is to map any captured frame to the reference image and store any pixel only once.

To evaluate both the images, the camera 106 should be connected to a computer or processor, but not necessarily the same control computer or processor that controls the printer 102. The camera 106 and computer can be connected by various known methods such as via wired communications (i.e., ethernet cable), or wirelessly (i.e., Bluetooth). For example, the analysis can be performed on an external laptop, connected by a USB to the camera 106. The camera 106 can send information to the laptop via USB for analysis. The laptop can have its own analysis tool, have a portal specific to the camera 106, or have other means for analysis. Generally, the analysis can be done by known image quality assessment methods.

For example, the quality assessment system 100 may first calculate a numeric quality score for an image or pattern based on various parameters. Subsequently, the quality score can be compared to the quality scores of reference images. In another embodiment, quality assessment system 100 can assign and compare quality scores of certain characteristics of a printout. For example, the delta E of color patches within a printout can be assigned a quality score and compared to the quality score of a pre-set color book, such as Panton. In another embodiment, an image can be transformed into binary images. After which, the system can perform edge detection using algorithms such as the Hough transform or Sobel filter during the evaluation process.

Figure 2:
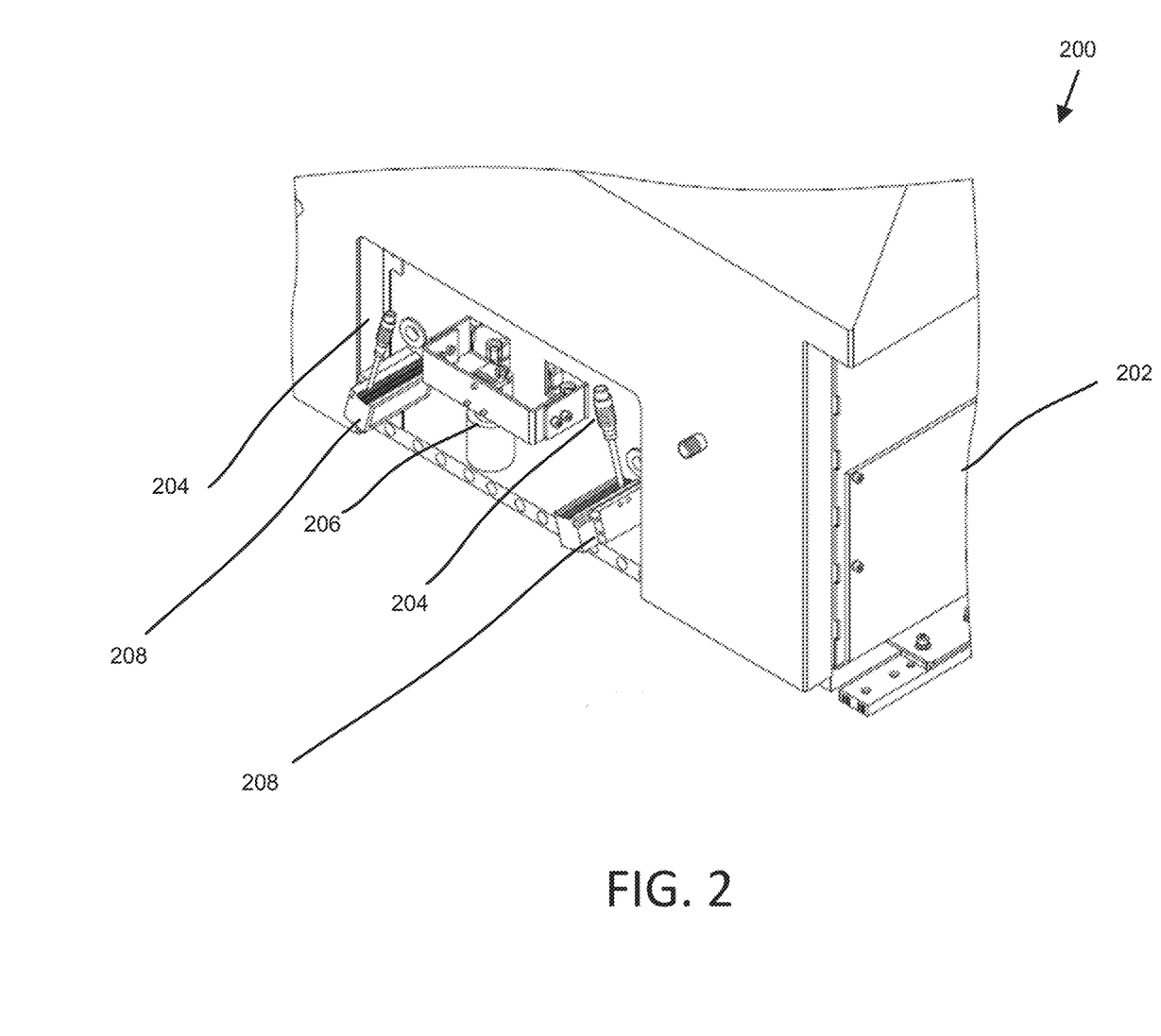
FIG. 2 illustrates a close-up view of the printer quality assessment system within a printer component.

FIG. 2 shows a close-up of quality assessment system 200 within a printer component 202 including image capture device(s) (i.e., camera 206) and light source(s) 204. The light source(s) 204 can be mounted on adjustable rail system 208. Adjustable rail system 208 can allow for light source(s) 204 to slide along the rail system 208 and change its angle in relation to the printed image. For example, the images captured by the camera 206 may contain hot spots because the light source(s) 204 was too close to the printed image. A control computer can instruct the light source(s) 204 to be moved away from the printed image by either changing the angle of the light source(s) 204 in relation to the printed image, by sliding the light source(s) 204 along the rail system 208, or both.

Figure 3:
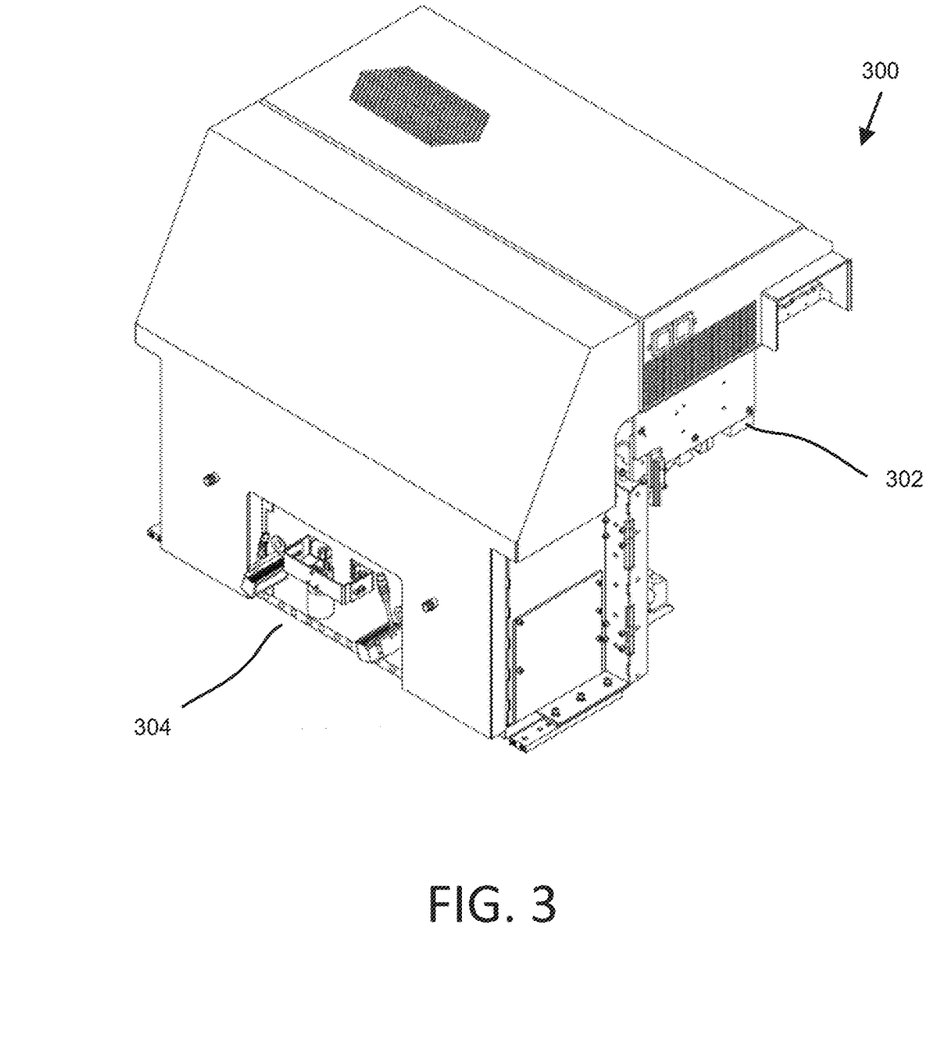
FIG. 3 illustrates a macro view of a network connected quality assessment system within a printer component.

FIG. 3 shows a macro view of an embodiment of a network connected quality assessment system 300 within a printer component 302. By being network connect, network connected quality assessment system 300 can communicate with other network connected printers. Network connected printers can communicate details of reference images, quality assessment parameters, camera settings, light settings, or other relevant details. For example, the printer component 302 can be a part of a WiFi connected printer. The printer may be assessing its quality using a certain reference image and its numeric quality score. The printer may then provide details of the reference image to other printers within the same or other WiFi network. By doing so, the other printers can use the reference image and its score in similar situations. In another example, the printers may indicate to a user than another printer, within the same network, is functioning optimally when the current printer is not. Additionally, a faulty printer may be able to send printing commands to an optimally functioning printer and alert the user of the transfer.

Figure 4:
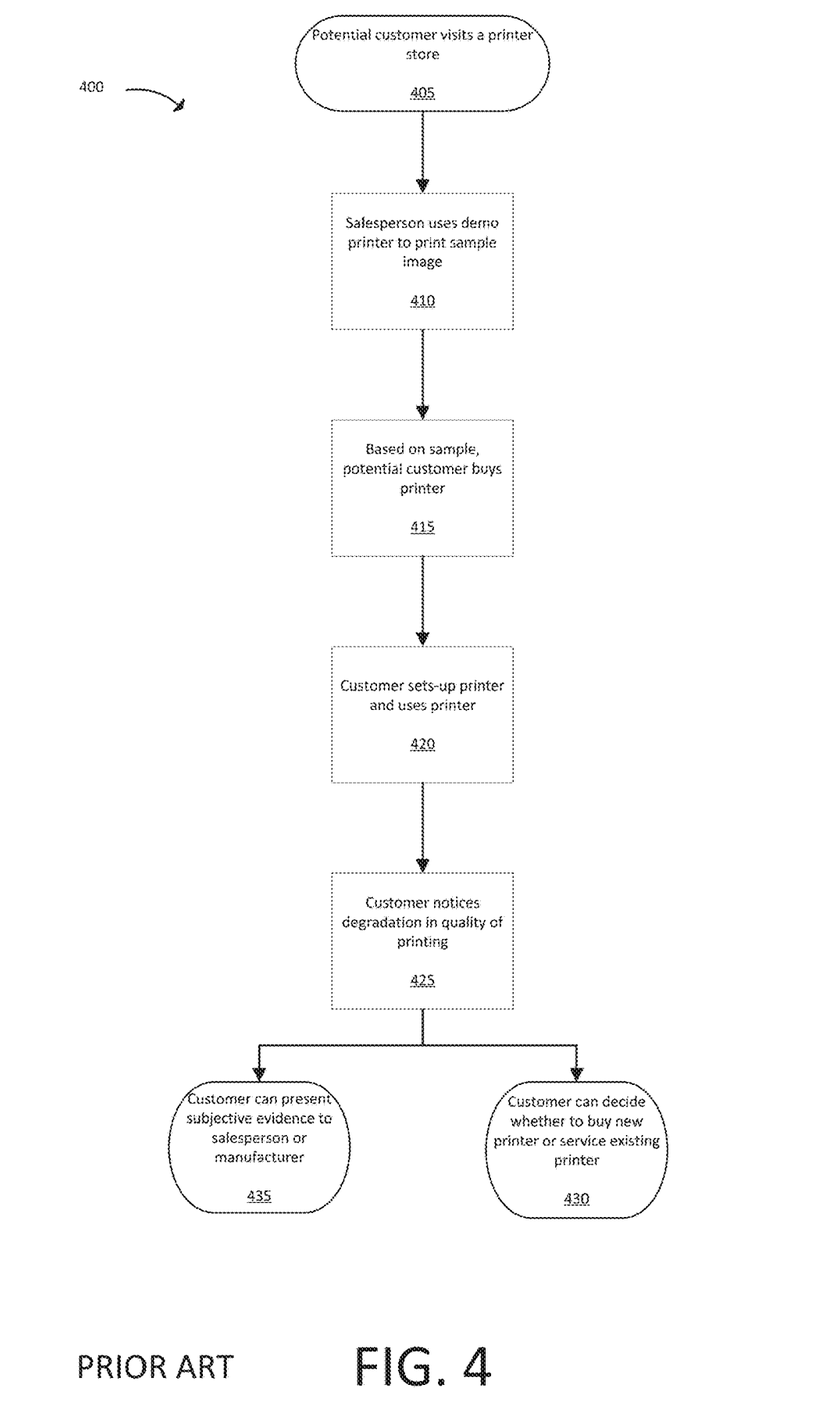
FIG. 4 is a block diagram of the current customer experience prior to using the system and method described herein.

FIG. 4 is a block diagram of the customer experience prior to using the system and method described herein. This figure is merely to illustrate the current state of the art and not to show characteristics of the system and method described herein. In step 410, the potential customer evaluates the quality of a printer model based on a demo printer of the same model. The demo can include printing an image with different colors, sizes, resolution, or other characteristics of an image. For example, a salesperson may print an image of a sunset for a potential customer. The potential customer may look at the printed image and see that the various colors of the sunset are displayed clearly in the printed image.

Thus, in step 415, based on the evaluation of the capabilities of the demo printer, the potential customer may decide to buy the same model printer as the demo printer. Conversely, in some situations, the customer can also buy the demo printer. In step 420, the customer can set up the printer and begin to use it. The customer may set up the printer in their home by following a user manual, prior experience and knowledge, or combination of relevant skills. After installation, the customer may use the printer for a period of time, during which there are no major issues, and the customer is content with the printer. At a point in the future, in step 425, the customer notices a degradation in quality of the images printed by the printer. This degradation could be blurred lines, ink smudges, lower resolution, or other errors.

The customer may then decide that the purchased printer is defective. In the current state of the art, the customer has two options: step 430 or step 435. In step 430, the customer can decide whether the buy a new printer or service the current one. This decision can be based on multiple factors such as cost, time, need, etc. In step 435, the customer can present evidence of degradation to the salesperson or manufacturer with the hopes of being able to exchange the faulty printer for a new printer or getting a refund. For example, the customer can show a salesperson a recently printed image with ink smudges and blurred lines. To which, the salesperson or manufacturer can argue or present evidence of their own that the printer is functioning as expected, that the fault is due to user error, that it is due to faulty installation, or one of several other responses. Although the customer may be able to rebut some of the salesperson's responses, the customer still must spend time, energy, and resources to get to an amenable conclusion. In other words, the customer's issues will likely not be resolved easily.

Figure 5:
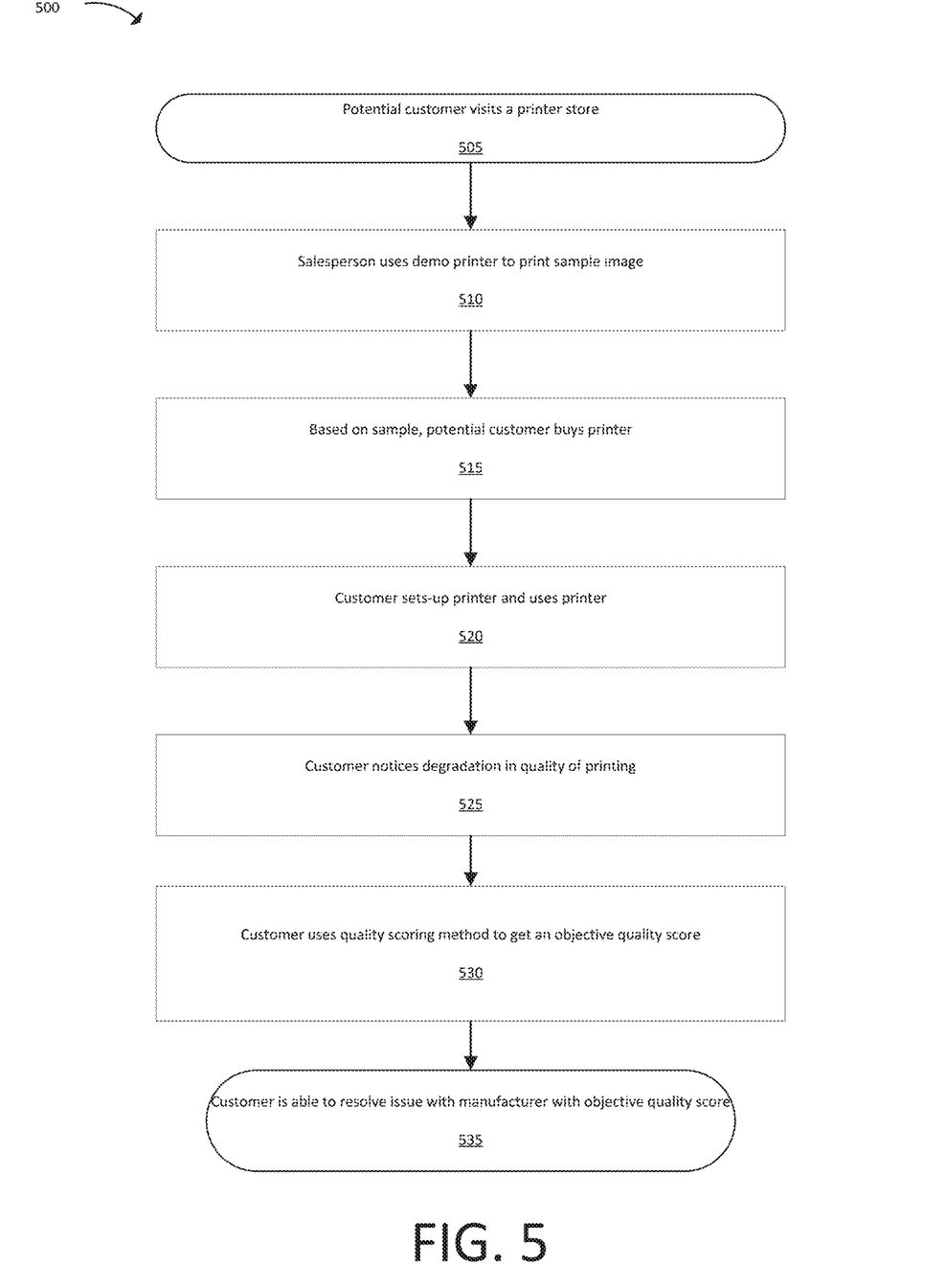
FIG. 5 is a block diagram of the customer experience when using the system and method described herein.

Conversely, FIG. 5 shows the improved experience of the customer when the method and system described herein is used. An objective evaluation can eliminate debates and sometimes even legal battles over the performance of a printer when customers seek a resolution such as compensation for or even to return the potentially defective printer.

Steps 505, 510, 515, 520, and 525 are similar to steps taken by the customer in FIG. 4. In summary, a customer purchases a printer based on the capabilities of a similar model printer during a pre-sale demo. Unfortunately, the customer, after purchasing and using the printer, becomes dissatisfied with the printer's performance and decides to seek a resolution from the salesperson or manufacturer of the printer. In step 530 the customer is able to obtain an objective numeric quality score to present to the salesperson or manufacturer. With this evidence, the customer may be able to easily resolve the issue by, for example, obtaining a refund or replacement machine.

For example, a customer may notice, at home, that their printer is no longer printing images of high quality (i.e., ink smudges, blurred lines, etc.). The customer may then decide to use the assessment method and system described herein. The system can provide the customer with an objective numeric quality score based on an evaluation of both a recently printed image and a reference image or previously printed image. In step 535, if there is a degradation indicated by the numeric quality scores, the customer can present both the numeric quality scores to the salesperson and resolve the issue. For example, the system may provide a numeric quality score on a scale between 1 to 10, with 10 indicating high quality. The system may provide a quality score of 9 for the reference image, and a quality score of 4 for the recently printed image. Thus, the customer has objective evidence of degradation.

In another embodiment, the salesperson or manufacturer of the printer may provide an image and its quality score, which was calculated when the printer was new. The customer can now use this score as the reference, rather than using a reference image. Accordingly, the customer can then directly compare the reference score to the quality score of the recently printed image. For example, the manufacturer of a printer may provide a numeric quality score and corresponding image to the customer (i.e., in the manual), along with optimal settings for the printer. The customer can then use similar settings and print the same image at a later time to verify if the printer has degraded.

In an embodiment, the quality assessment system can provide a user with a report of the evaluation. The report can include details such as the location on the newer image that may be distorted, possible at-home troubleshooting ideas, possible causes of issues, and other combinations of relevant information. In another embodiment, the system may be connected to a communication network such as WiFi. The system can use the network to troubleshoot itself, contact the manufacturer, send an alert to a local salesperson, contact other printers within the network, or contact a user's network connected device (i.e., mobile device, laptop, etc.).

Figure 6:
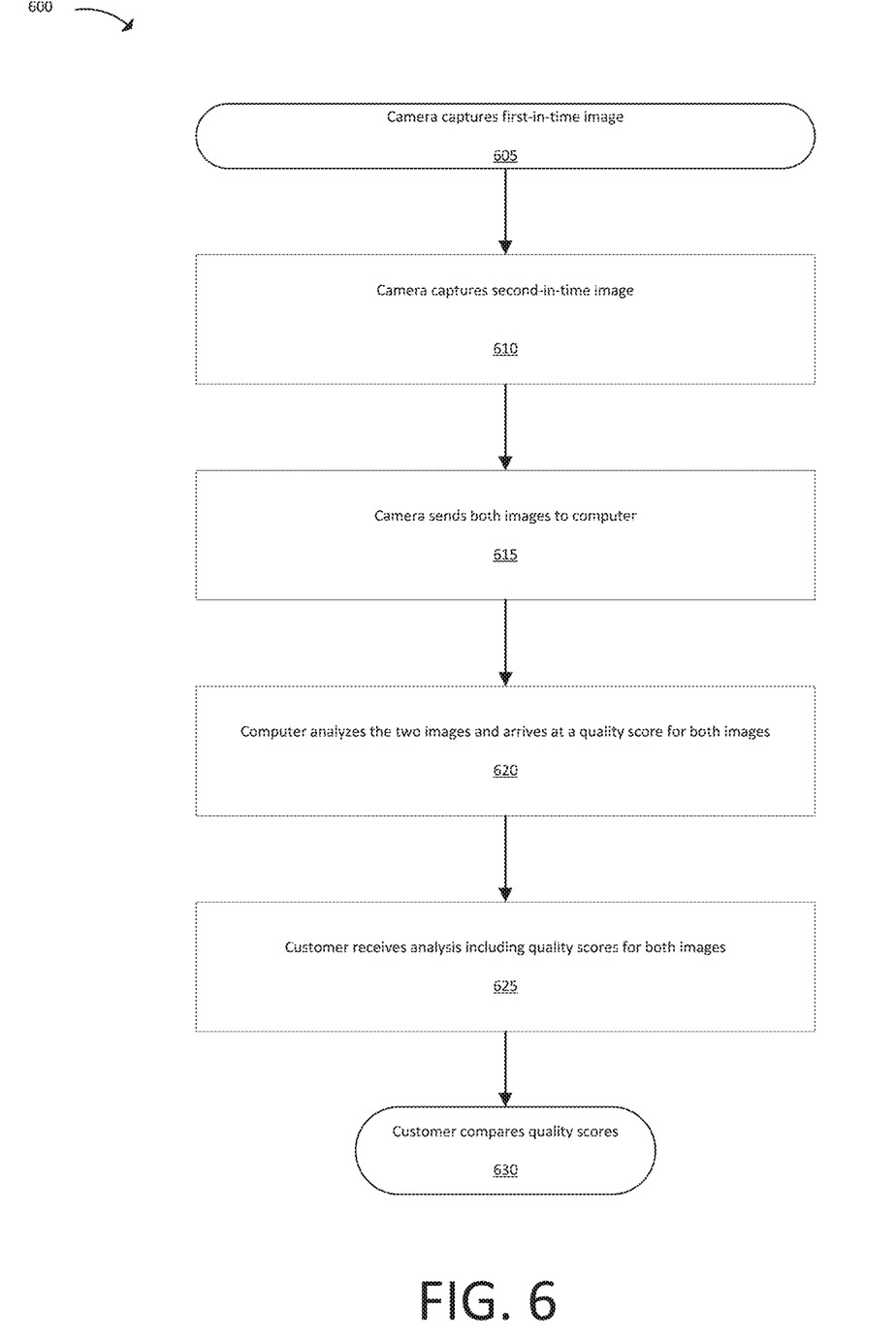
FIG. 6 is a high-level block diagram of the steps taken to objectively evaluate two images printed at different time.

FIG. 6 is high-level flowchart of the steps the system takes to objectively evaluate two images printed at different times. In step 605, a reference image or the first-in-time image is captured by a camera. In step 610, the later-in-time or second image is captured. As mentioned above, both images should preferably be of the same resolution, of the same image, and taken under similar conditions.

In step 615, the camera(s) sends the captured images to the computer for analysis. The computer may be on board the printer or external to the printer. An external computer may be connected wirelessly or by wire, and through known methods such as USB, WiFi, Bluetooth, etc. In step 620, the computer evaluates the images to arrive at a quality score for both images. The computer can use multiple known methods of analysis such as, for example, full-reference models, the Structural Similarity Index, the Visual Information Fidelity system, the Human Visual System, reduced-reference methods, grouping clusters of mismatched areas, or other image quality assessment methods. These methods can be used to assess various image and printer characteristics such as, for example, sharpness, noise, dynamic range, tone reproduction, contrast, color accuracy, distortion, vignetting, banding, ink drops, missing nozzles, exposure accuracy, lateral chromatic aberration, lens flare, color moiré, size, frequency, number of mismatched areas, etc. By using multiple evaluation criteria, the process eliminates false alarms due to temporal noise and differences in conditions within the tolerances of the product.

In an embodiment, the quality assessment system can allow a certain amount of degradation in a criterion without flagging it as an error (i.e., a tolerance level). The threshold tolerance value can be programmed to be adapted to the content of the image or to the viewing distance of the image. Moreover, each of the criterion may be given a different importance reflected in a weight figure. The final quality score can be calculated by using various methods such as summing of all the weighted scores of each criterion, averaging the scores of all the criteria, or other similar calculations. Before reporting the final score to a user, the system can also apply statistical error analysis such as mean-squared error, standard deviation calculations, or use regression models to avoid false positives.

In an embodiment, the quality assessment system may analyze each criterion differently (i.e., different tolerances, weights, scales, etc.). For example, the processor may analyze sharpness on a 0-100 scale. During analysis of an image, it may detect a loss in sharpness by 5 units from one cluster of pixels to another cluster of pixels. However, the processor can be programmed to have a tolerance of 10 units for sharpness. Thus, when the processor detects a loss 5 units from one cluster to another cluster, the processor will not flag it as an error. If, however, a sharpness degradation above 10 units is detected then it will be accounted for in the quality score.

Furthermore, the quality assessment system may be programmed to average the scores of all criterion to calculate a final quality score. For example, the processor may be programmed to evaluate several properties on a 0-100 scale. After the analysis, the processor may arrive at scores of 40 for sharpness, 50 for contrast, 60 for banding, 70 for color distortion, and 80 for noise. The processor can then provide an overall quality score that is the average of the scores of each property; here, 60 out of 100. The user can then compare this quality score with a reference score.

In an embodiment, the quality assessment system can be programmed to use anomaly-detection techniques such as k-nearest neighbor, local outlier factor, isolation forests, Bayesian networks, Hidden Markov models, cluster-analysis, ensemble techniques, etc. Furthermore, the quality assessment system can be trained using known datasets such as the Outlier Detection DataSets. Thus, the quality score can be based on the number of anomalies the processor detects. For example, the processor may use cluster-analysis to cluster pixels together based on their commonalities (i.e., color, location, object, etc.). However, if a pixel or a group of pixels do not have commonalities with any of the larger clusters, then the processor may flag the pixels as an anomaly. The quality score can be equal to the number of anomalies found.

In an embodiment, the quality score can be based on a pre-set list of errors. The list can include errors such as ink blots, ink smudges, color banding, missing nozzles, abrupt changes in sharpness, incorrect color use, and other printing errors. The pre-set list of errors can, for example, be developed during pre-sale training and stored in the processor's memory. The processor may use methods such as image classification, object detection, semantic segmentation, instance segmentation to detect errors, etc. to detect these errors. For each detected error, the computer may be programmed to deduct from a pre-set value or add a point to the total.

In an embodiment, a processor can be on board the printer and be programmed to use an image classification technique to detect errors. Image classification is a method of training a computer to recognize patterns in an image and classify the patterns into known categories. There are several image classification techniques known in the art that can be applied, such as Convolutional Neural Networks. The majority of image classification techniques are trained using databases such as ImageNet, a dataset with approximately 1.2 million high-resolution training images. An example of applying image classification in the quality assessment system can be that a user prints an image of a red car and notices that the printout has a car with blue spots. The user can then decide to use the quality assessment system described herein. The processor, after receiving the image from the image capture device, can apply an image classification technique to classify a cluster in to a "red car" category. However, the processor can also notice that there are several pixels, within the boundary of the larger "red car" category of pixels, that cannot be classified into the "red car" category. Therefore, the processor can add one point for each cluster of pixels that are within the boundary of the "red car" cluster but should not be classified as a "red car". The total number of wrongly classified pixel clusters can result in the quality score of the image.

In another embodiment, a processor can be external to the printer, such as a laptop. The processor can be connected to the printer via, for example, USB, and programmed to use object detection. During object detection, the processor can apply techniques such as a Region-based Convolutional Neural Network (R-CNN), Fast R-CNN, Region Proposal Network, etc. Generally, object detection separates an image into object bounding boxes and non-object bounding boxes. The object bounding boxes surround objects within the image and non-object bounding boxes surround other areas. Thus, the processor can detect anomalies within the bounded areas using other anomaly detection methods.

In another embodiment, an external processor can be programmed to use semantic segmentation. Semantic segmentation tries to understand the role of each pixel in the image. For example, a user can print an image of a busy street with pedestrians, cars, stop signs, trees, etc. The processor can try to classify each pixel in the image as being a pedestrian, car, stop sign, tree, etc. Thus, if the image has pixels that are classified as a pedestrian but a subset of pixels within the cluster labeled pedestrian does not match the classification, the processor can flag it as an error. Additionally, the processor may also flag clusters that cannot be categorized as an error. As before, the processor can add to or deduct from a value to arrive at a quality score.

In steps 625 and 630, the customer receives and compares the quality score to a reference score. The customer can then see, objectively, whether the printer has degraded or not degraded. The result of the evaluation can be indicated to the customer in multiple ways such as on the computer screen, a printout, or a notification from a mobile application. By evaluating the results, the customer, for example, may be able to see where on the second print where the degradation in quality occurred, or which characteristic of the print has degraded. Moreover, the customer can get other data including statistical data of each of the criterion.

Generally, the reference score can be based on a print of the same image printed at a previous time. The previous print can be printed by the same printer or a different printer. For example, the reference score can be based on a print by a demo printer that the user was shown during pre-sale activity. The reference score can also be based on a print by a different printer of the same model. The same model printer can communicate the reference score through WiFi, ethernet, Bluetooth, and other known communication methods. Moreover, a printer may be able to wirelessly access a database with quality scores, the images that the quality scores were based on, the settings the printer used during printing, and other information.

For example, the system and method described herein may be able to evaluate images printed by two different printers. To evaluate an image printed at one time by one printer using the same image printed by another printer at a different time, the information from the first in time printing can be transferred to the second printer. Printers may transfer data to each other by various known methods, such as WiFi, Bluetooth, cloud serves, etc. For example, a printer manufacturer may create a global network to connect its printers, demo sites, customers, etc. Thus, customers and printers may be able to use shared information to evaluate printer quality.

In an embodiment, the printer can run self-correcting measures to remedy the possible causes of the issues. For example, a different in quality could be due to ink blots the image. The printer can provide this data in the report to the customer. The customer can then opt to, for example, return the printer or ask for a refund. Alternatively, the customer may be able to allow the printer to run self-correcting measures such as running a diagnostic check on the nozzles, the print heads, and other possible causes of the issues. After which, the printer may be able correct errors by, for example, resetting itself, opting for default settings, or entering a safe mode.

In another embodiment, the printer may periodically run a quality check. For example, the printer may store a reference image in its memory and once every month, the printer may print the reference image and compare the quality score of the print out to the quality score of the reference image. After which and if necessary, the printer may automatically run self-correcting measures or relay the information to the customer using the methods discussed above (i.e., WiFi, Bluetooth, etc.)

Figure 7:
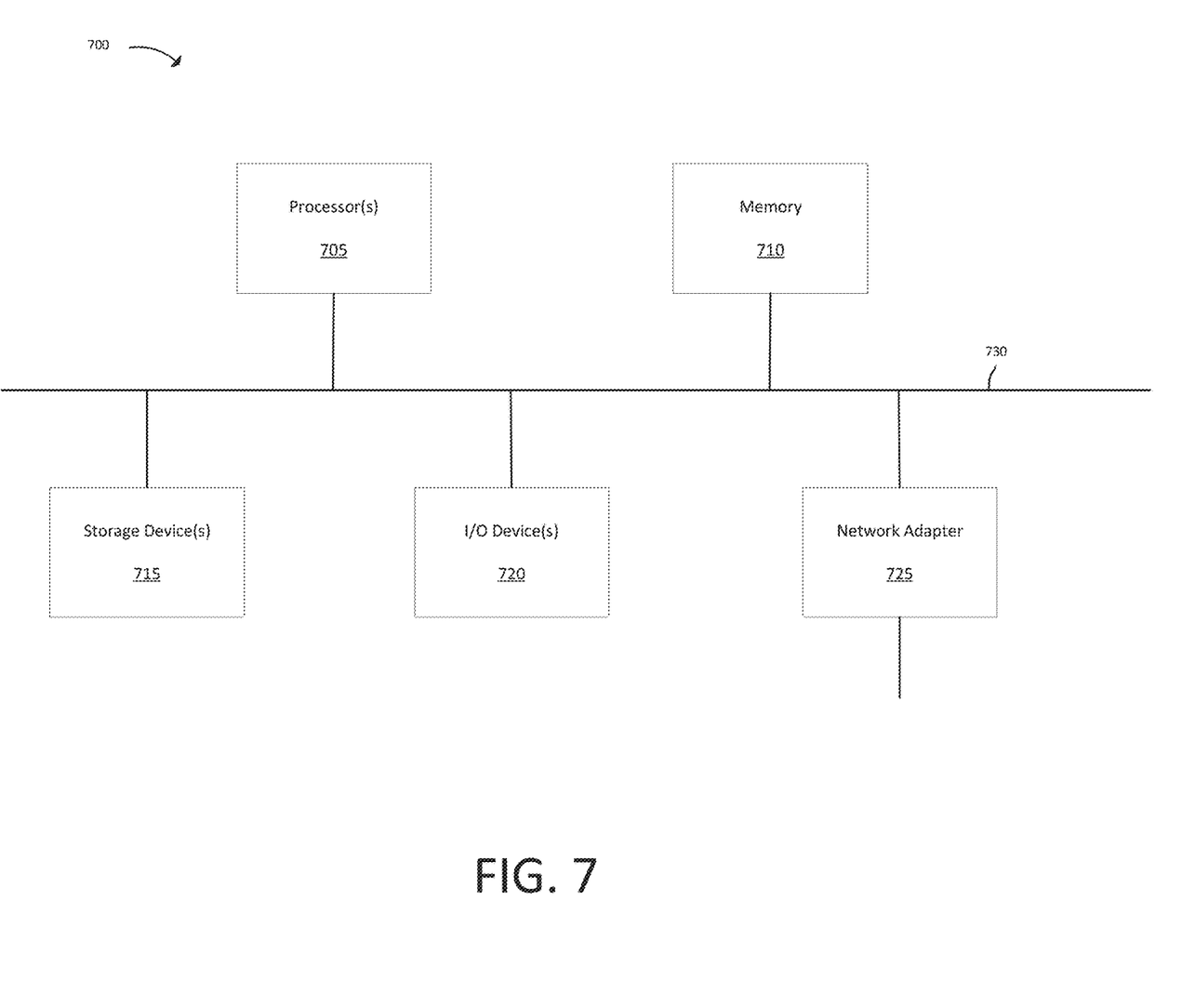
FIG. 7 illustrates a diagrammatic representation of a machine in the example form of a computer system within which a set of instructions for causing the machine to perform one or more of the methodologies discussed here may be executed.

FIG. 7 is a block diagram of a computer system as may be used to implement certain features of some of the embodiments described herein. The computer system may be a server compute, a client computer, a person computer (PC), a user device, a tablet PC, a laptop computer, a personal digital assistant (PDA), a cellular telephone, an iPad, a Blackberry, a processor, a telephone, a web appliance, a network router, switch or bridge, a console, a hand-held console, a (hand-held) gaming device, a music player, any portable mobile, hand-held device, wearable device, or any machine capable or executing a set of instructions (sequential or otherwise) that specify actions to be taken by that machine.

The computing system 700 may include one or more central processing units ("processors") 705, memory 710, input/output devices 720 (e.g., keyboard and pointing devices, touch devices, display devices), storage devices 715 (e.g., disk drives), and network adapters 725 (e.g., network interfaces) that are connected to an interconnect 730. The interconnect 730 is illustrated as an abstraction that represents any one or more separate physical buses, point to point connections, or both connected by appropriate bridges, adapters, or controllers. The interconnect 730, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (12C) bus, or an Institute of Electrical and Electronics Engineers (IEEE) standard 1394 bus, also called "Firewire".

The memory 710 and storage devices 715 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non-transitory, media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 725).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A printer quality scoring system comprising:
   a printer including:
      an image capture device affixable to a first printer component and capable of capturing an image of a printout, wherein the printout is in an environment relative to the image capture device; and
      a light source affixable to a second printer component and operable to emit light toward the printout; and
   a processor communicatively coupled to the printer, the processor capable of evaluating the properties of both a first-in-time printout and a second-in-time printout and providing a numeric quality score for both the first-in-time printout and the second-in-time printout.

2. The printer quality scoring system of claim 1, wherein the image capture device comprises any of area scan camera, line scan camera, or scanner.

3. The printer quality scoring system of claim 1, wherein the first-in-time printout and second-in-time printout are of a same image.

4. The printer quality scoring system of claim 1, wherein the first printer component and second printer component comprise any of a print head carriage or printing table.

5. The printer quality scoring system of claim 1, wherein the first-in-time printout and second-in-time printout are printed by two different printers.

6. The printer quality scoring system of claim 1, wherein multiple image capture devices are affixable to the first printer component.

7. The printer quality scoring system of claim 1, wherein the angle and position of the light source is adjustable.

8. The printer quality scoring system of claim 1, wherein the printer comprises any of a one pass printer or a multi-pass printer.

9. The printer quality scoring system of claim 1, wherein the properties include sharpness, noise, dynamic range, tone reproduction, contrast, color accuracy, distortion, vignetting, exposure accuracy, lateral chromatic aberration, lens flare, color moiré, size, frequency, number of mismatched areas, or any combination thereof.

10. The printer quality scoring system of claim 1, wherein the processor is on board the printer.

11. The printer quality scoring system of claim 1, wherein the processor is structurally separate from the printer.

* * * * *